UNITED STATES PATENT OFFICE.

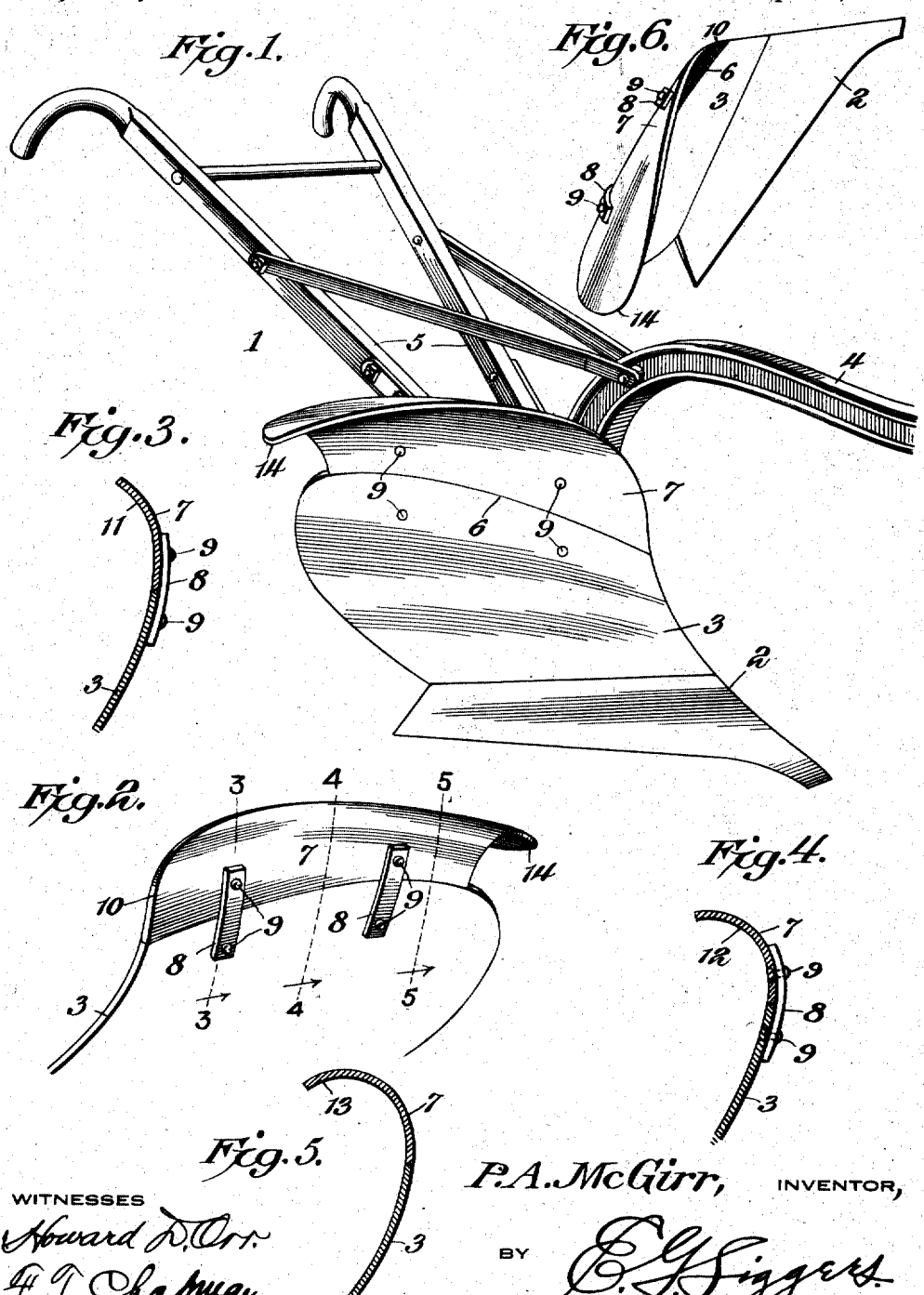

PATRICK A. McGIRR, OF DE KALB, ILLINOIS.

PLOW.

1,280,057.

Specification of Letters Patent. Patented Sept. 24, 1918.

Application filed April 24, 1918. Serial No. 230,518.

*To all whom it may concern:*

Be it known that I, PATRICK A. McGIRR, a citizen of the United States, residing at De Kalb, in the county of Dekalb and State of Illinois, have invented a new and useful Plow, of which the following is a specification.

This invention has reference to plows, and its object is to provide a construction whereby the speed of the plow may be greatly increased without liability of throwing the dirt over the top of the mold board and which at the increased speed will keep the dirt in the furrow where it belongs and cover up weeds and trash on the ground.

In accordance with the invention the mold board of the plow is carried above the normal top line of the mold board with the part providing the increased height extending from the front or land side edge of the mold board to near the rear edge thereof, the higher portion rising nearly straight up at the front end and progressively curving or twisting toward the furrow side of the plow until at the rear end of the high portion the curvature has a downward trend. The result of this is that the dirt or sod is given a corresponding twist causing it to fall into the proper furrow without tending to pass over the top of the mold board. Because of the positive directing of the sod toward the furrow side the speed of plowing may be greatly increased. The arrangement permits the employment of a light tractor, since the load imposed upon the tractor even at the increased speed is relatively small, and consequently the ground is not compacted as would occur where a heavy tractor is used.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawing:—

Figure 1 is a perspective view of a plow with the attachment applied.

Fig. 2 is a rear face view of the mold board with the attachment applied.

Fig. 3 is a section on the line 3—3 of Fig. 2.

Fig. 4 is a section on the line 4—4 of Fig. 2.

Fig. 5 is a section on the line 5—5 of Fig. 2.

Fig. 6 is a top plan view of the plow share and mold board with the attachment applied to the latter.

Referring to the drawing, there is shown a plow 1 and since the structure of the plow itself does not enter into the invention further than that the plow is a turning plow, there is no need of any extended description or any detail showing thereof. In Fig. 1 there is shown a plow share 2, a mold board 3, a plow beam 4 and handles 5, all of which may be of usual form.

Attached to the upper edge of the mold board 3, which upper edge is indicated at 6, there is a supplemental mold board 7 extending from the front or land side end of the mold board 3 to a point close to the rear end of the mold board. The supplemental mold board 7 may be held to the main mold board 3 in rising relation to the latter by straps 8 on the land side face of the mold board and secured to both the main and supplemental mold boards by bolts 9 or any other suitable fastening devices.

The supplemental mold board 7 is curved from front to rear with its width from the top edge 6 of the main mold board progressively increasing and its curvature in the lateral direction also progressively increasing. The curvature is such that a concave face is presented on the furrow side of the plow, flattened and facing outwardly at the front end and pronouncedly curved and overhanging at the rear end. The supplemental mold board 7, therefore, at its front end rises from the front edge of the mold board 3 as substantially a continuation of the curvature of the mold board at such point and indicated at 10 in Fig. 2. Further back, say about at the point represented by the section line 3—3, the supplemental mold board rises on a curvature having a shorter radius than that of the rubbing face of the mold board toward the furrow side of the plow and indicated at 11 in Fig. 3. At a point still farther back, say about the position of the section line 4—4 in Fig. 2, the radius of curvature of the supplemental mold board is shortened over the radius of curvature at 11 in Fig. 3, so that the overhanging portion of the supplemental mold board becomes more pronounced, as indicated at 12 in Fig. 4. Because of the progressively continuing curvature and overhang of the furrow-side edge of the supplemental mold board 7, by the time the position represented by the section line 5—5 of Fig. 2 is reached, there is a pronounced overhang of the supplemental mold board and the curvature is downward, as indicated at 13 in Fig. 5. Finally at the rear end of the supplemental mold board where it stops a short distance from the rear end of the main mold board and about over the rear end of the plow share, the overhang and downward trend is quite pronounced, as indicated at 14 in Figs. 1, 2 and 6.

The supplemental mold board, whether made separately or in one piece with the main mold board, is suitably curved, as described, to prevent the dirt from being thrown too far by the plow share, especially when the plow is speeded up, and even though the plow travels several times faster than has heretofore been found feasible, the dirt is turned over and delivered in its proper place in the furrow.

Ordinary turning plows, if driven faster than two or three miles an hour, will throw the dirt too far. The laterally curved overhanging supplemental mold board rises nearly straight upwardly at its forward end and then tending outwardly from the front face of the mold board with increasing curvature in a lateral direction until, near the rear end of the mold board, the curvature is downward. This causes the dirt to be progressively turned over and deposited within the proper furrow even though the speed of the plow be increased from the previously limited rate of two or three miles an hour, up to as high as ten miles an hour. This permits plowing to be done by tractor and especially by a light tractor which will not readily sink into relatively soft ground and which may draw one or two or more plows with a speed much greater than has heretofore been permissible with ordinary turning plows, thereby accomplishing the plowing of many acres of ground per day. At the same time the plowing will be more satisfactorily performed than has heretofore been accomplished with ordinary turning plows even though moving slowly.

What is claimed is:—

1. In a turning plow, a mold board provided with a curved mold board extension supplemental thereto and rising from the top of the mold board from a point substantially coincident with the front of the mold board to a point approaching but stopping short of the rear of the mold board, said extension having a large radius of curvature near the front edge of the moldboard and a relatively small radius of curvature near the rear end of the moldboard and with its rear end portion curved downwardly.

2. In a turning plow, a mold board having an upward extension curving outward from the face of the mold board with progressively increasing curvature from the front end of the mold board to a point closely adjacent to the rear end thereof and with the rear end of the extension overhanging the mold board and presenting its concave face to the ground.

3. In a plow, a mold board having an upward extension from its normal top line with the extension curved outwardly from the front face of the mold board and overhanging the same by progressively increasing amounts from the front edge of the mold board to a point adjacent to the rear edge thereof.

4. An attachment for the mold boards of turning plows, comprising a supplemental mold board conforming to the top edge of the main mold board and having a progressively increasing curvature from front to rear, whereby the rear end of the supplemental mold board when attached to the plow mold board overhangs the latter and is downwardly directed at its outer edge.

5. A supplemental mold board for the mold boards of turning plows, having a lower edge conforming to the top edge of the plow mold board and of a length approaching that of the top edge of the plow mold board, said supplemental mold board having a progressively increasing curvature from front to rear to rise upwardly at the front end and curve downwardly at the rear end when installed on a plow mold board.

6. In a turning plow provided with a plow share and a mold board, a supplemental mold board on top of the main mold board and of a length to reach from the front or land side end of the mold board to a point over the rear end of the plow share, the supplemental mold board having a progressively increasing twist toward the furrow side from front to rear with its front end rising throughout from the top edge of the main mold board, said front end having its curvature substantially a continuation of the curvature of the moldboard, and the supplemental moldboard at the rear end curving downwardly.

7. In a turning plow, a moldboard provided with a moldboard extension supplemental thereto, said supplemental board having a width increasing progressively from the front to the rear end of the plow, and being also curved laterally outward, the curvature thereof increasing progressively from the front to the rear end.

In testimony, that I claim the foregoing as my own, I have hereto affixed my signature in the presence of two witnesses.

PATRICK A. McGIRR.

Witnesses:
HUGH WEIGHTMAN,
JOHN O'BRIEN.

Copies of this patent may be obtained for five cents each, by addressing the "Commissioner of Patents, Washington, D. C."